No. 874,216. PATENTED DEC. 17, 1907.
H. LINZEL & C. BISCHOFF.
PROCESS FOR MAKING NON-ALCOHOLIC BEVERAGES FROM FERMENTED LIQUIDS.
APPLICATION FILED NOV. 3, 1904.
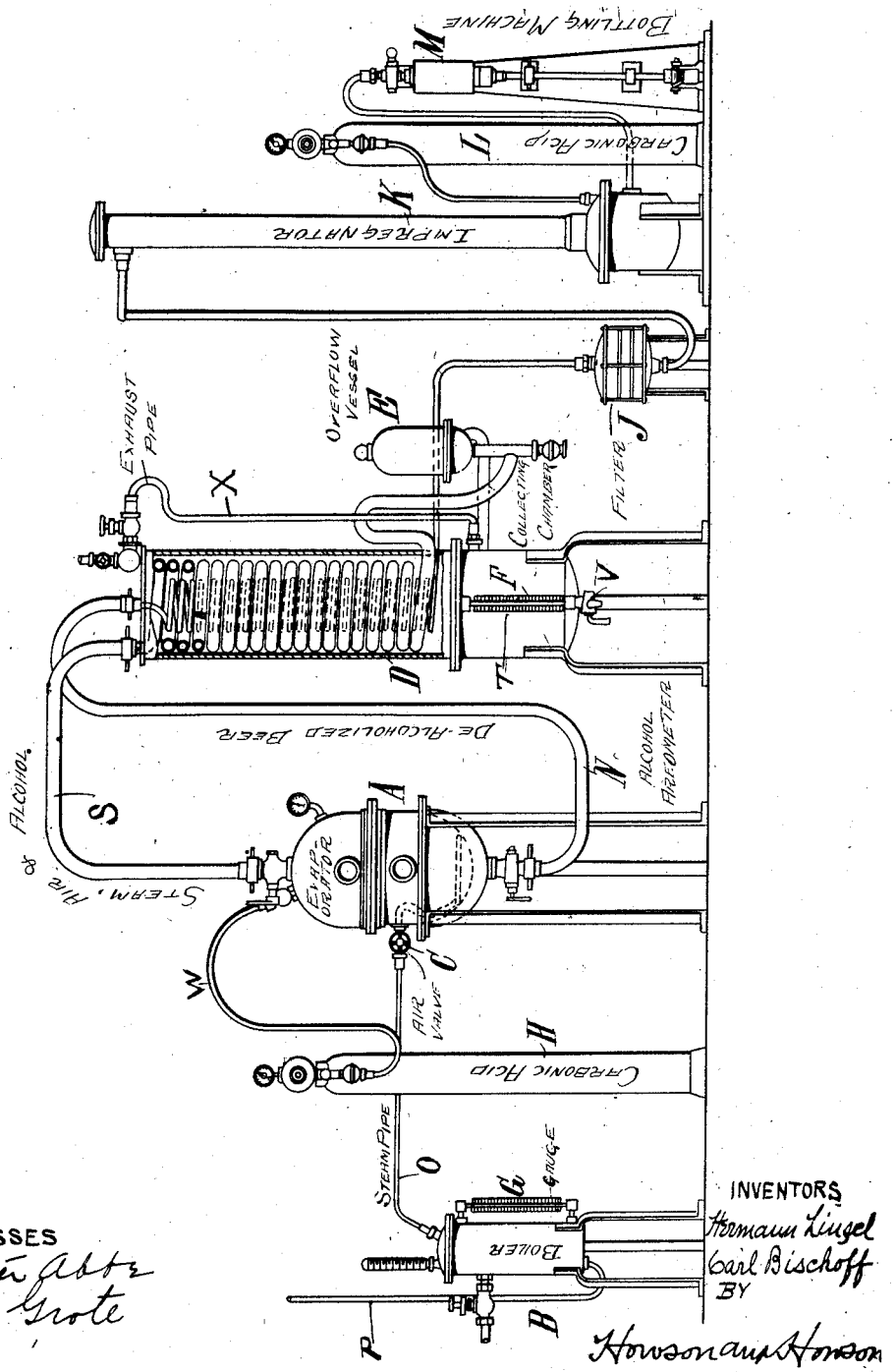
WITNESSES
INVENTORS
Hermann Linzel
Carl Bischoff
BY
Howson and Howson
ATTORNEYS

UNITED STATES PATENT OFFICE.

HERMANN LINZEL AND CARL BISCHOFF, OF BERLIN, GERMANY.

PROCESS FOR MAKING NON-ALCOHOLIC BEVERAGES FROM FERMENTED LIQUIDS.

No. 874,216.　　　　　Specification of Letters Patent.　　　　Patented Dec. 17, 1907.

Application filed November 3, 1904. Serial No. 231,322.

*To all whom it may concern:*

Be it known that we, HERMANN LINZEL and CARL BISCHOFF, subjects of the King of Prussia, residing in Berlin, Germany, have invented an Improved Process for Making Non-Alcoholic Beverages from Fermented Liquids, of which the following is a specification.

In the processes hitherto used for extracting the alcohol from beer for the purpose of making a non-alcoholic beer-like beverage or drink, the beer is subjected to distillation, either at ordinary pressure or in a vacuum, a reflux-cooler being used in order that all volatile products other than the alcohol may be returned to the beer. During the distillation, when the process is carried on in a vacuum, it has been customary to pass a current of inert gas through the beer to produce a continuous agitation therein. These old processes involve certain disadvantages however. Thus a more or less considerable concentration of the beer always results during the distillation and precipitates also occur, which cannot be subsequently dissolved. Furthermore, even after distilling off about one-third of the entire liquid, a certain proportion of alcohol is still contained in the beer, while if by the use of the reflux cooler, the volatile substances in the beer which are carried off with the alcohol in the distillation, are returned to the beer in the evaporator, the length of time during which the process must be continued to secure approximate de-alcoholization very seriously impairs the quality of the final product.

We have found that when de-alcoholizing a fermented liquid, for instance beer, in vacuum, its normal constituents, except the alcohol which is intentionally removed, are best preserved by keeping its volume uniform during the distillation. To this end we inject into the beer or other liquid during the distillation a continuous current of steam and air, or the like inert gas. The addition of air to the injection has been found to accelerate the evaporation of the alcohol so that it takes place much more rapidly than when steam alone is injected, while on the other hand, the condensation of the steam while passing through the beer replaces the alcohol which is evaporated and drawn off with the air and uncondensed steam. The regulation of the injection in any specific case to secure a condensation of the steam which balances the evaporation of the alcohol can be determined only by tests. It will naturally vary with the quantity of alcohol contained in the beer or other liquid which is to be de-alcoholized. It has been found that 6 or 7 liters of water in the form of steam are sufficient for the treatment of 100 liters of the usual Munich beer. The amount of air introduced is regulated by the strength of the steam current which sucks the air with it into the evaporator. It is only by experimental tests that the proportion can be determined for the treatment of the particular liquid in hand. The current of air and steam sucked or drawn off by the exhaust carries the alcohol with it, while the less easily volatile ingredients of the hops and of the aromatic products of the beer remain in the liquid; and, by reason of the fact that the concentration of the de-alcoholized liquid remains the same, practically no precipitates are formed.

A test of the process may be readily made with say 10 to 12 liters of beer of about 2 to 4 per cent. by weight of alcohol in a vacuum apparatus of a capacity of about 30 liters. Distillation for about an hour at a temperature of from 40° to 50° C. (under from 50—60 mm. pressure) will give a de-alcoholized beer in which there remains but about 0.75 per cent. alcohol.

A suitable apparatus for carrying out this process is shown in the accompanying drawing.

An evaporator A with manometer, etc. is shown connected through the pipe O with a steam boiler B provided with a gage G. Steam is introduced into this boiler B through a pipe P to heat the water therein. The decrease of the amount of the water in the boiler as shown by the gage indicates the quantity of water which is being introduced into the beer in the form of steam. Near the entrance of the pipe O into the evaporator is located an air intake controlled by the valve C provided with a nozzle or relief valve. As the steam passes through the pipe into the evaporator A, air is sucked through the valve C and mingles with the steam as it enters the evaporator. After passing through the beer or other liquid in the evaporator the steam and air and the alcohol taken up thereby, pass through the pipe S into a cooler D, through which the pipe S is passed in the form of a coil. From the cooler the pipe S leads the condensed water and alcohol to an overflow vessel E which is provided with a glass bell under vacuum and with an outlet to the collecting vessel T. An alcohol areometer F is connected to the latter in like manner as the gage G to the boiler B. This apparatus is similar to that commonly used in rectifiers for benzole and the like except that in the present case it works under vacuum which is obtained through the exhaust pipe X opening into the collecting chamber T. The rise and fall of the alcohol areometer is precisely the same. The contents of this collecting vessel may be drawn off through the cock V. The beer after having been desalcoholized, is forced, by means of carbonic acid compressed in the tank H which is connected through a valved pipe W with the evaporator A, through the pipe N, which passes coiled through the cooler D to a filter J. From here it is led to the impregnator K connected with the carbonic acid tank L, and finally it is led to the bottling machine M.

While other apparatus may be used for carrying out our process, that shown in the drawings is simple and well adapted to the successful use of the process.

We claim as our invention:

The herein described process for making a non-alcoholic drink from a fermented liquid, such as beer, consisting in passing a current of water vapor and a current of air together through the alcoholic liquid, under diminished air-pressure, in such manner that by means of a partial condensation of the water vapor the liquid is kept continuously at the same volume, and its alcohol is sucked off with the surplus water vapor and the rarefied air.

In testimony whereof we have signed our name to this specification, in the presence of two subscribing witnesses.

HERMANN LINZEL.
CARL BISCHOFF.

Witnesses:
　JOHANNES HEIN,
　HENRY HASPER.